United States Patent
Wilson, III et al.

(10) Patent No.: US 10,703,422 B2
(45) Date of Patent: Jul. 7, 2020

(54) UTILITY VEHICLE HAVING A CARGO BED WITH A REMOVABLE FRONT WALL

(71) Applicant: Honda Motor Co., Ltd., Tokyo (JP)

(72) Inventors: Robert T. Wilson, III, Delaware, OH (US); Samira S. Johnson, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 16/161,947

(22) Filed: Oct. 16, 2018

(65) Prior Publication Data

US 2020/0114981 A1 Apr. 16, 2020

(51) Int. Cl.
*B62D 33/033* (2006.01)
*B62D 33/037* (2006.01)

(52) U.S. Cl.
CPC .......... *B62D 33/033* (2013.01); *B62D 33/037* (2013.01)

(58) Field of Classification Search
CPC .. B62D 33/033; B62D 33/037; B62D 33/023; B62D 33/02; B62D 33/027; B62D 33/0276
USPC ...................................................... 296/183.1
See application file for complete search history.

(56) References Cited

U.S. PATENT DOCUMENTS

| | | | |
|---|---|---|---|
| 5,295,602 A | 3/1994 | Swanson | |
| 6,419,299 B1* | 7/2002 | Pyo | B60J 1/1861 296/106 |
| 6,478,346 B1 | 11/2002 | Veser et al. | |
| 7,217,308 B2 | 5/2007 | Thanheiser | |
| 8,105,407 B2 | 1/2012 | Taniguchi | |
| 8,298,308 B2 | 10/2012 | Li | |
| 9,599,074 B2 | 3/2017 | Cho | |
| 9,714,628 B2 | 7/2017 | Uezu | |
| 9,776,481 B2* | 10/2017 | Deckard | B62D 21/183 |
| 9,809,102 B2* | 11/2017 | Sunsdahl | B62D 21/183 |
| 9,856,833 B2 | 1/2018 | Nagao | |
| 9,932,073 B2* | 4/2018 | Dube | B60K 15/063 |
| 2003/0122401 A1* | 7/2003 | Hashimoto | B60R 21/026 296/190.11 |
| 2003/0122402 A1* | 7/2003 | Takahashi | B60P 3/40 296/190.11 |

(Continued)

FOREIGN PATENT DOCUMENTS

EP 1589216 A1 10/2005
KR 101415396 B1 7/2014

(Continued)

OTHER PUBLICATIONS

"14-16 Polaris Rzr Xp 1000 & 900—Engine Access Door Panel" https://picclick.com/14-16-POLARIS-RZR-XP-1000-900-ENGINE-141932801811.html (Accessed Mar. 29, 2018).

(Continued)

*Primary Examiner* — Gregory A Blankenship
(74) *Attorney, Agent, or Firm* — Honda Patents & Technologies North America, LLC; Joshua J. Freier (57) ABSTRACT

A utility vehicle includes a cargo bed extending rearward of a vehicle seat where a front wall of the cargo bed is adjacent to the rearward side of the vehicle seat. The front wall of the cargo bed includes a handle and the front wall of the cargo bed is removable from the utility vehicle with at least a first connection, a second connection, and a third connection to allow access to the air cleaner once the front wall of the cargo bed is removed.

20 Claims, 11 Drawing Sheets

(56) References Cited

U.S. PATENT DOCUMENTS

| | | | |
|---|---|---|---|
| 2009/0195049 A1* | 8/2009 | Shimamura | B60P 1/16 298/12 |
| 2012/0031693 A1* | 2/2012 | Deckard | B60K 17/08 180/68.3 |
| 2012/0193932 A1* | 8/2012 | King | B60P 3/423 296/26.11 |
| 2014/0157736 A1 | 6/2014 | Choi | |
| 2014/0183894 A1* | 7/2014 | Yamamoto | B60P 3/423 296/24.43 |
| 2015/0061275 A1* | 3/2015 | Deckard | B62D 3/12 280/788 |
| 2015/0259011 A1* | 9/2015 | Deckard | B62D 21/183 280/781 |
| 2015/0367895 A1* | 12/2015 | Schwab | B62D 33/033 296/186.5 |
| 2015/0375614 A1* | 12/2015 | Osaki | B62D 21/183 180/291 |
| 2018/0072140 A1* | 3/2018 | Azzouz | B60J 5/00 |
| 2019/0242334 A1* | 8/2019 | Diehl | B01D 46/521 |
| 2019/0275916 A1* | 9/2019 | Keziah | B60P 3/423 |

FOREIGN PATENT DOCUMENTS

| | | |
|---|---|---|
| KR | 101536603 B1 | 7/2015 |
| KR | 101619895 B1 | 5/2016 |

OTHER PUBLICATIONS

"14-16 Polaris Rzr Xp 1000 & 900-Oem Engine/Firewall Cover" https://picclick.com/14-16-POLARIS-RZR-XP-1000-900-OEM-ENGINE-FIREWALL-112873809652.html (Accessed Mar. 29, 2018).

"1997-2001 Honda Crv Oem Rear Hatch Tailgate Jack Panel Lid Cover Trim" https://www.ebay.ie/itm/1997-2001-HONDA-CRV-OEM-REAR-HATCH-TAILGATE-JACK-PANEL-LID-COVER-TRIM-Gray-b33/173229600889?hash=item285549f079:g:k7sAAOSwWUIasuUO (Accessed Mar. 29, 2018).

* cited by examiner

UTILITY VEHICLE HAVING A CARGO BED WITH A REMOVABLE FRONT WALL

BACKGROUND

Utility vehicles powered by internal combustion engines may typically include a cargo bed. The engine is typically located in an engine compartment at the front of a vehicle. However, a utility vehicles may include an internal combustion engine that is located in the middle or rear of the utility vehicle and adjacent to a cargo bed. A utility vehicle with an internal combustion engine located in the middle or rear typically includes a removable portion that is near or attached to the cargo bed so the engine and its components, such as an air cleaner or oil fill cap.

Current configurations for this removable portion can lack a secure fit and require tools or a great deal of force to remove by hand. The lack of a secure fit can result in the removable portion becoming loose or falling when riding over rough terrain. Additionally, too much force in taking off the removable portion may result in damage to the removable portion, such as bowing or warping. It would therefore be desirable to more easily remove and securely reinstall a portion of the utility vehicle that provides access to the engine and its components, such as an air cleaner or oil fill cap.

BRIEF SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

In accordance with one aspect of the present disclosure, a utility vehicle includes an engine at least partially encompassing an area rearward of a vehicle seat and a cargo bed extending rearward of the vehicle seat. A front wall of the cargo bed is adjacent to the rearward side of the vehicle seat, the front wall of the cargo bed includes a handle, and the front wall of the cargo bed is removable from the utility vehicle with at least a first connection. The first connection includes the handle that is formed into the front wall of the cargo bed with a connecting portion extending from a forward wall for connecting the front wall to the utility vehicle.

In accordance with another aspect of the present disclosure, a utility vehicle includes a cargo bed extending rearward of a vehicle seat where a front wall of the cargo bed is adjacent to the rearward side of the vehicle seat. The front wall of the cargo bed includes a handle and the front wall of the cargo bed is removable from the utility vehicle with at least a first connection. The handle is formed into the front wall of the cargo bed with a connecting portion extending from a forward wall for connecting the front wall to the utility vehicle.

In accordance with yet another aspect of the present disclosure, a utility vehicle includes a cargo bed extending rearward of a vehicle seat where a front wall of the cargo bed is adjacent to a rearward side of the vehicle seat. The front wall of the cargo bed is removable from the utility vehicle with at least one upper connection and at least one lower connection to allow access to the oil fill cap once the front wall of the cargo bed is removed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments are hereinafter described in detail in connection with the views and examples of FIGS. 1-11, wherein like numbers indicate the same or corresponding elements throughout the views. It should, of course, be understood that the description and drawings herein are merely illustrative and that various modifications and changes can be made in the structures disclosed without departing from the concepts of the present disclosure.

Figure 1:
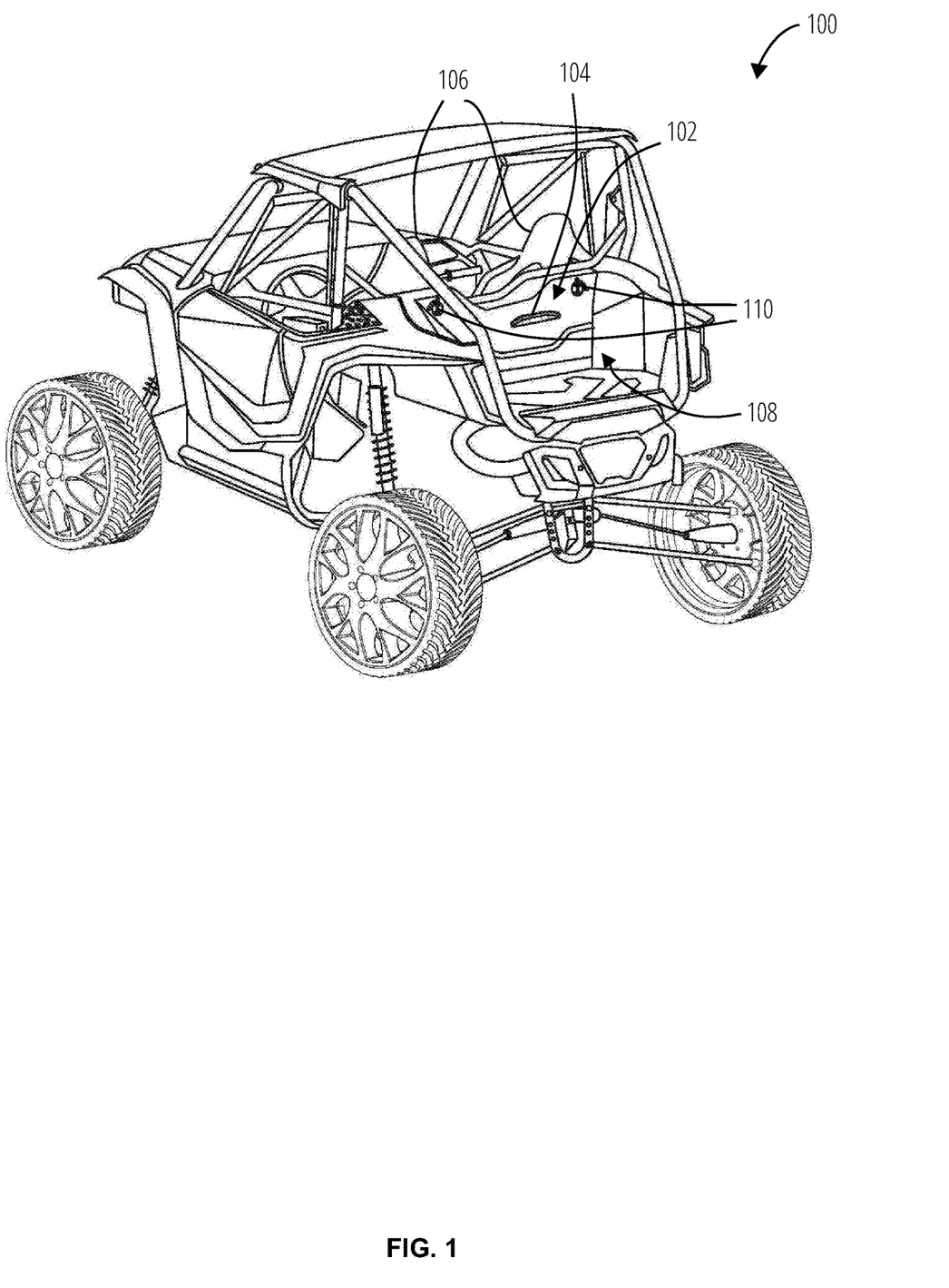
FIG. 1 is a perspective view of the utility vehicle with the front wall of the cargo bed attached.

FIG. 1 is a perspective view of a utility vehicle 100, particularly of the type known as an all-terrain vehicle ("ATV") or a side-by-side vehicle ("S×S"). In the utility vehicle 100 illustrated in FIG. 1, a cargo bed 108 is located rearward of a vehicle seat 106 of the utility vehicle 100. The cargo bed 108 includes a front wall 102 that is adjacent to the rearward side of the vehicle seat 106. The front wall 102 of the cargo bed 108 is removable. It will be understood that the front wall 102 may include only a portion of a front end of the cargo bed 108, or a majority of the front end of the cargo bed 108 within the scope of the present disclosure.

Figure 2:
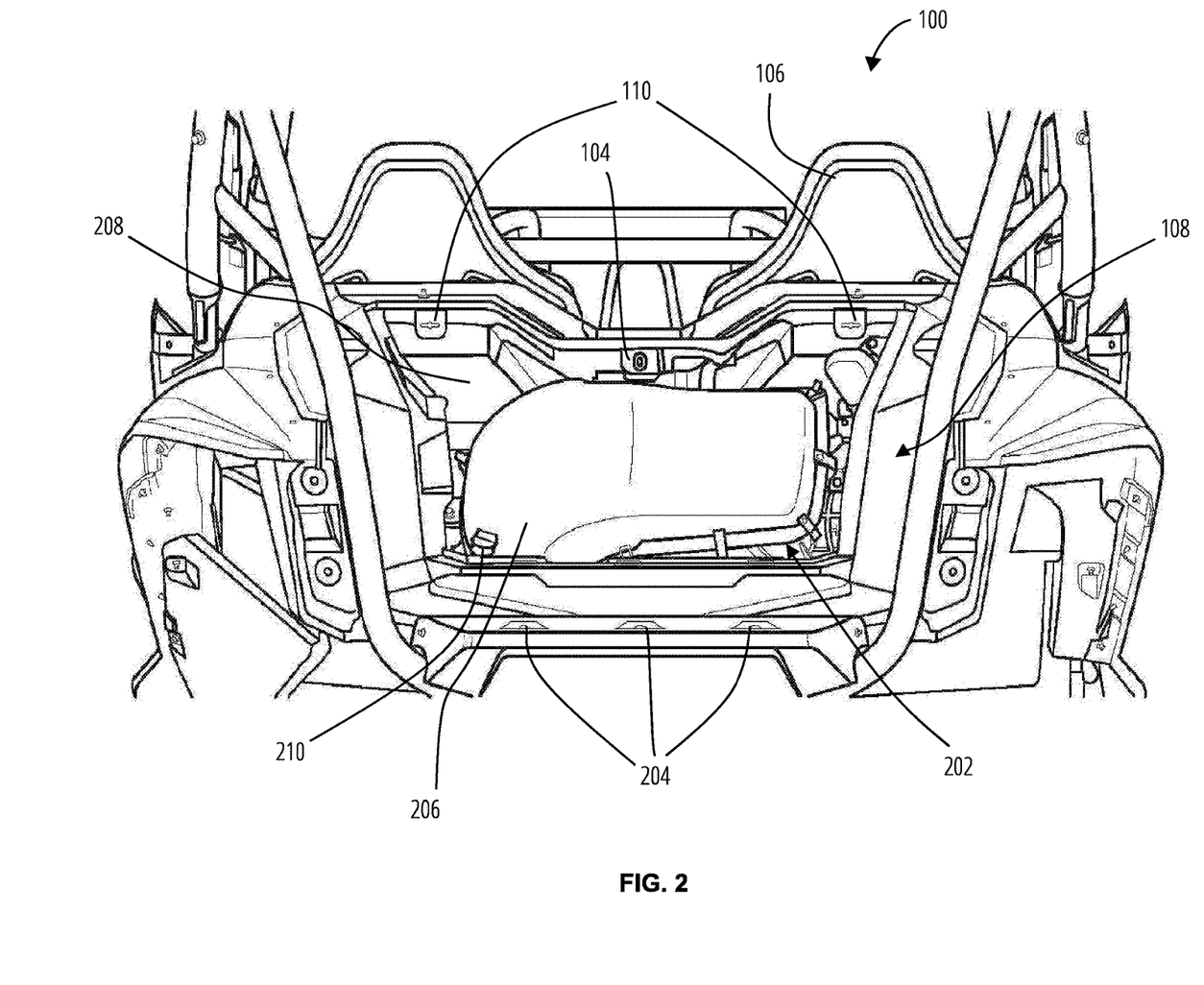
FIG. 2 is a rear view of the of the cargo bed with the front wall removed.

One embodiment of the utility vehicle 100 is illustrated in FIG. 2. FIG. 2 is a rear view of the of the cargo bed 108 with the front wall 102 removed. FIG. 2 shows an engine 202 that is at least partially encompassing an area rearward of the vehicle seat 106. The engine 202 may include an air cleaner 206, an oil fill cap 210, and other engine components that are accessible for service with the front wall 102 removed. The air cleaner 206 may include a metal or plastic case covering an air filter. The oil fill cap 210 may include a twist off cap that may be removed to allow engine oil to be added. As shown in FIG. 2, the cargo bed 108 includes an upper surface 208 that is forward and above the front wall 102. The location of the engine 202 is optional and may not be located in area that is not at least partially encompassing an area rearward of the vehicle seat 106.

Figure 3:
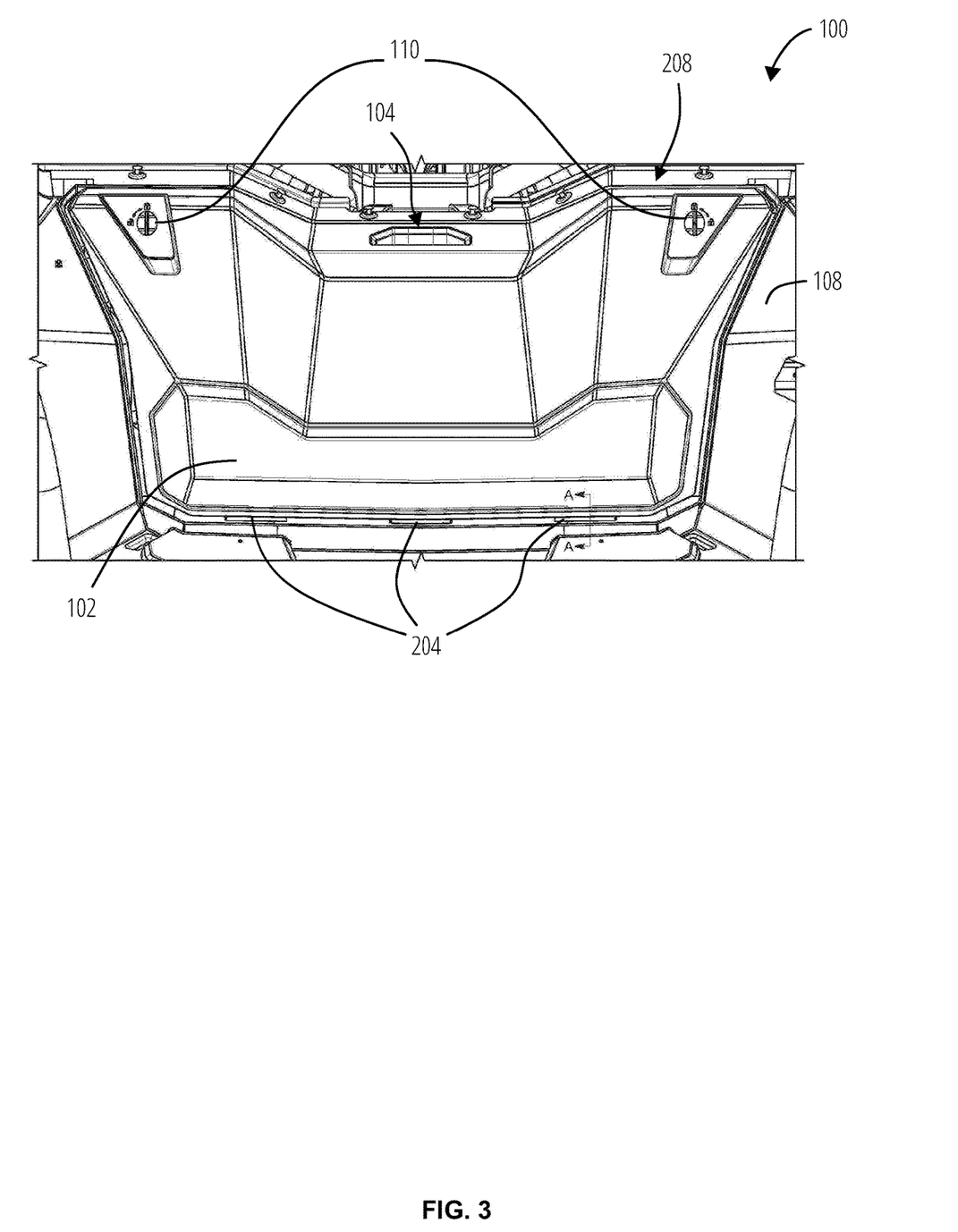
FIG. 3 is a rear view of the front wall attached to the cargo bed.
Figure 4:
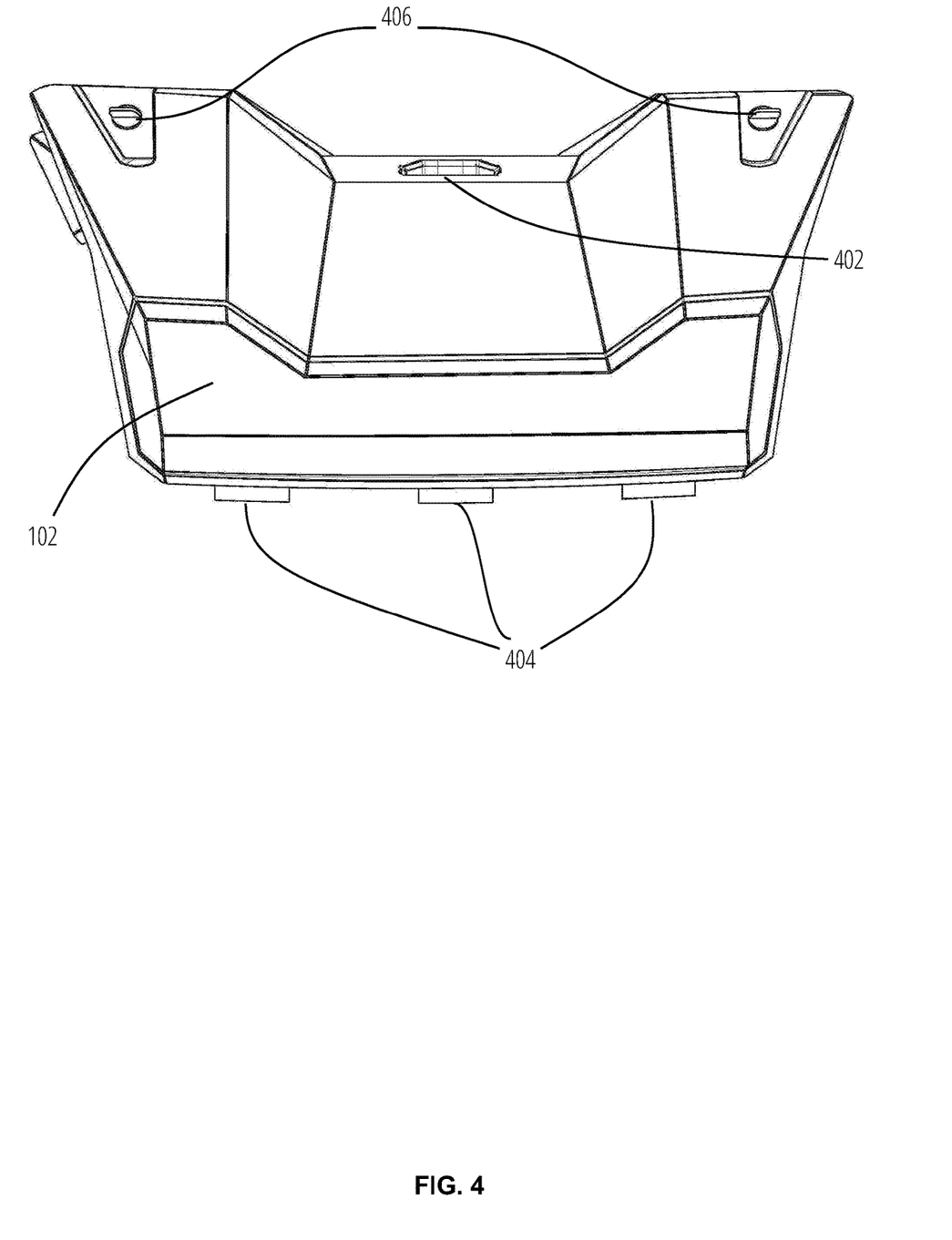
FIG. 4 is a rear view of the front wall.

FIG. 3 shows a close up rear view of the front wall 102 of the cargo bed 108 attached. The front wall 102 of the cargo bed 108 includes a first connection 104, a second connection 110, and a third connection 204 for securing the front wall 102 to the cargo bed 108. FIG. 4 illustrates a rear view the front wall 102 removed or uninstalled from the utility vehicle 100. The first connection 104 of the front wall 102 includes a handle 402. The second connection 110 of the front wall 102 includes at least one twist knob 406. However, it will be appreciated that other rotational attachment devices or methods may be used. For example, a rotatable lever or knob may be used instead. The front wall 102 includes a third connection 204. The third connection 204 may include at least one hook attachment 404 as shown in FIG. 4.

Figure 5:
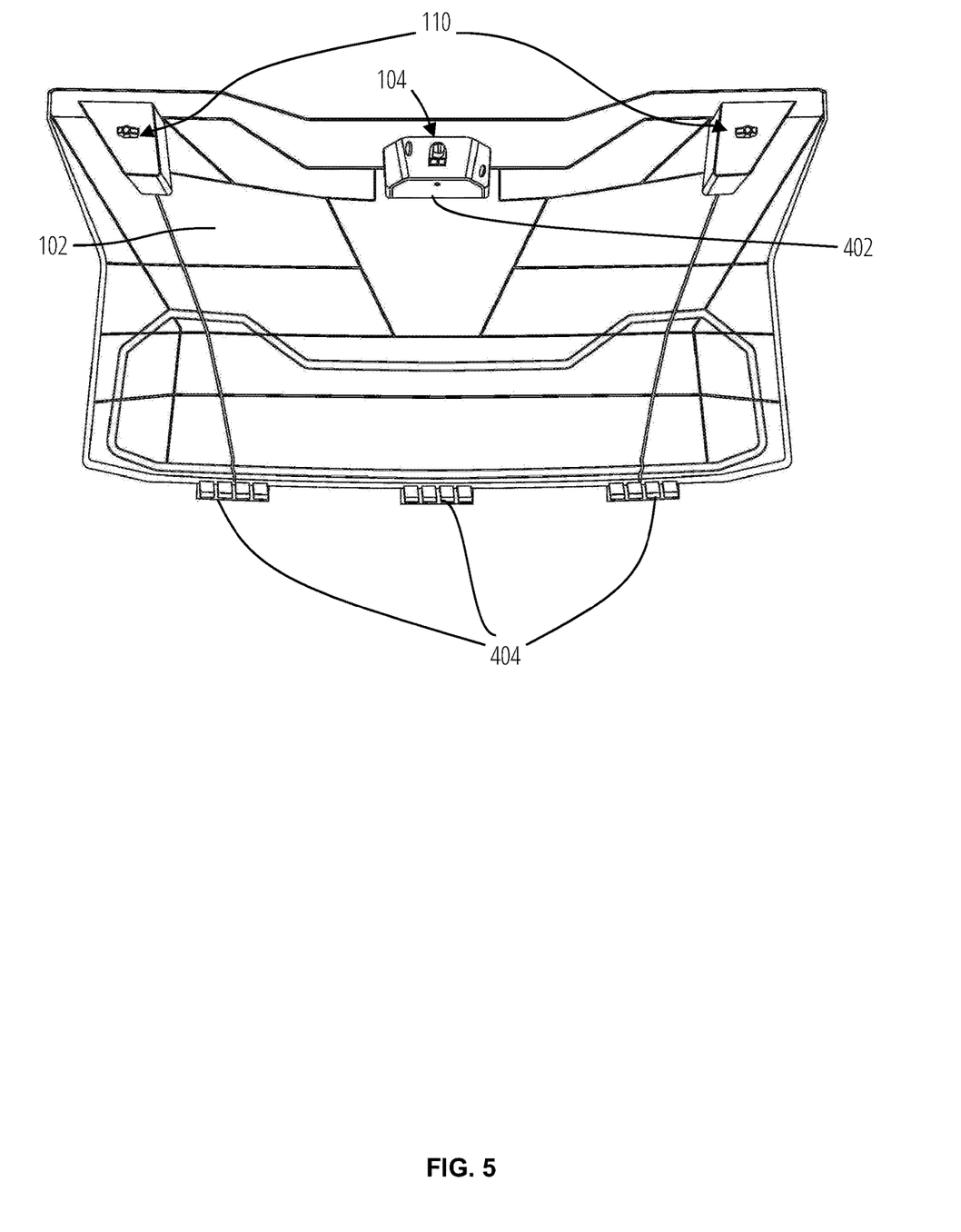
FIG. 5 is a front view of the front wall.

FIG. 5 is front view of the front wall 102 removed from the utility vehicle 100. As shown in FIG. 5, the first connection 104, and second connection 110 are extending toward the front of the utility vehicle 100 as a molded or formed surface of the front wall 102. Additionally, the at least one hook attachment 404 of the third connection 204 may include a variable surface for better engagement or retention to the cargo bed 108, as shown in FIG. 5.

Figure 6:
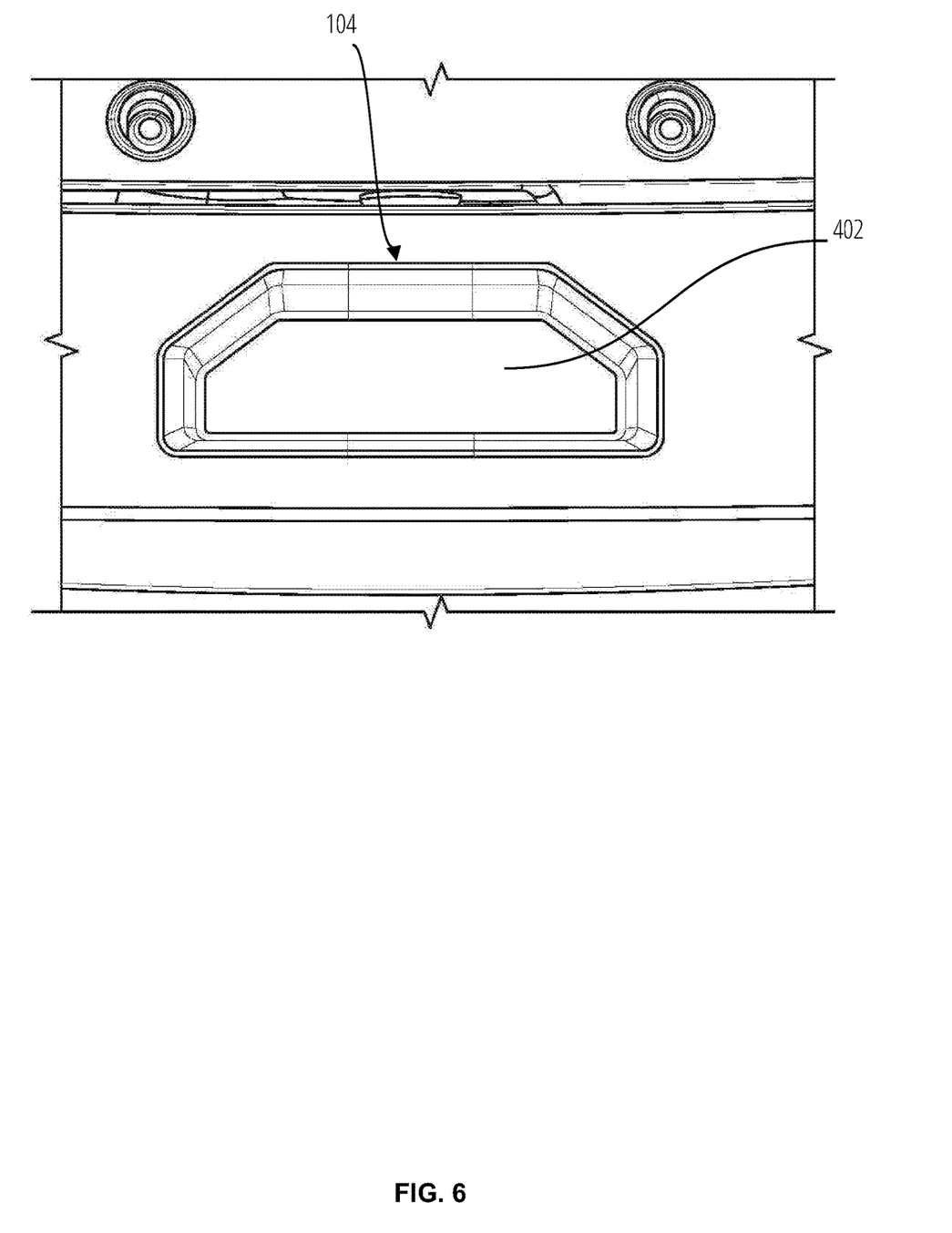
FIG. 6 is a rear view of the first connection.
Figure 7:
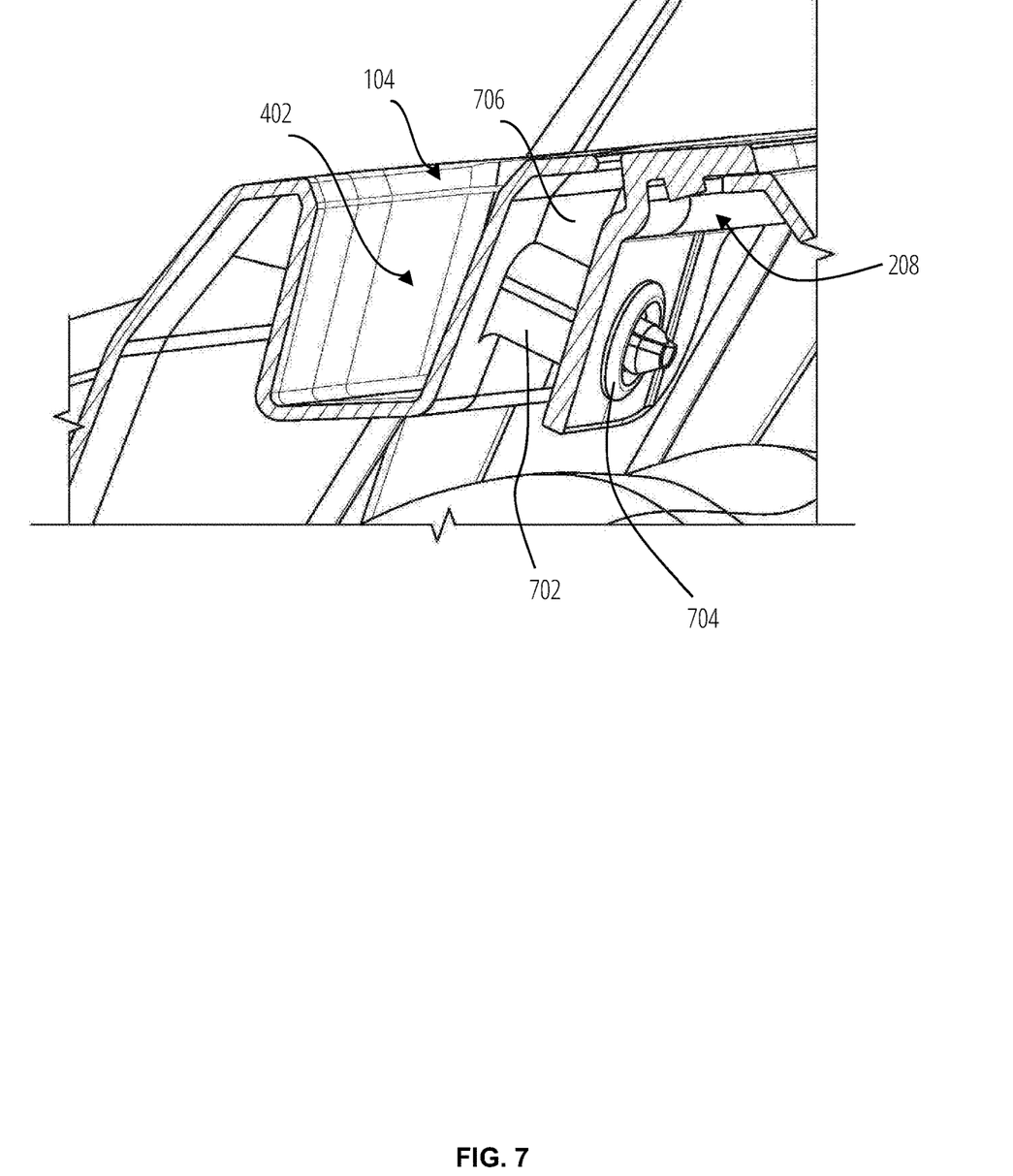
FIG. 7 is cutaway perspective view of the first connection.

The handle 402 of the first connection 104 is molded or formed into the front wall 102 of the cargo bed 108. FIG. 6 is a close up rear view of the first connection 104 with the handle 402 molded or formed into the front wall 102. FIG. 7 is a cut-away perspective view of FIG. 6 looking toward the rear of the utility vehicle 100. The first connection 104 is shown with a connecting portion 702 extending from a forward wall 706 of the handle 402. The handle 402 is envisioned to be molded or formed into the front wall 102 with an opening large enough for a hand. Also, the handle 402 may include three walls, where the forward wall 706 of the handle 402 is closest to the front of the utility vehicle 100 and adjacent to the upper surface 208 of the cargo bed 108. The upper surface 208 of the cargo bed 108 includes at least one grommet connection 704. The at least one grommet connection 704 secures the connecting portion 702 of the first connection 104 to the upper surface 208 of the cargo bed 108.

With the connecting portion 702 extending from the forward wall 706 of the handle 402, it allows the force to insert the connecting portion 702 into the at least one grommet connection 704 to be focused directly forward a pushing hand of a user in the molded in handle 402. Similarly, the force for removing the connecting portion 702 of the handle 402 is focused from a pulling hand of the user in the molded in handle 402. If the pushing or pulling force is not focused near or adjacent a connection, the front wall 102 may warp or bow when trying to install or remove from a user's hand location that is not near or adjacent the connection. With force being focused, it prevents the front wall 102 from bowing or warping. The at least one grommet connection 704 is sized to exert appropriate pressure against the connecting portion 702. Grommet connections are well known for securing components such as panels to another surface. Additionally, depending on the size and strength of the front wall 102 the first connection 104 may require more than one grommet connection to assure a secure fit.

Figure 8:
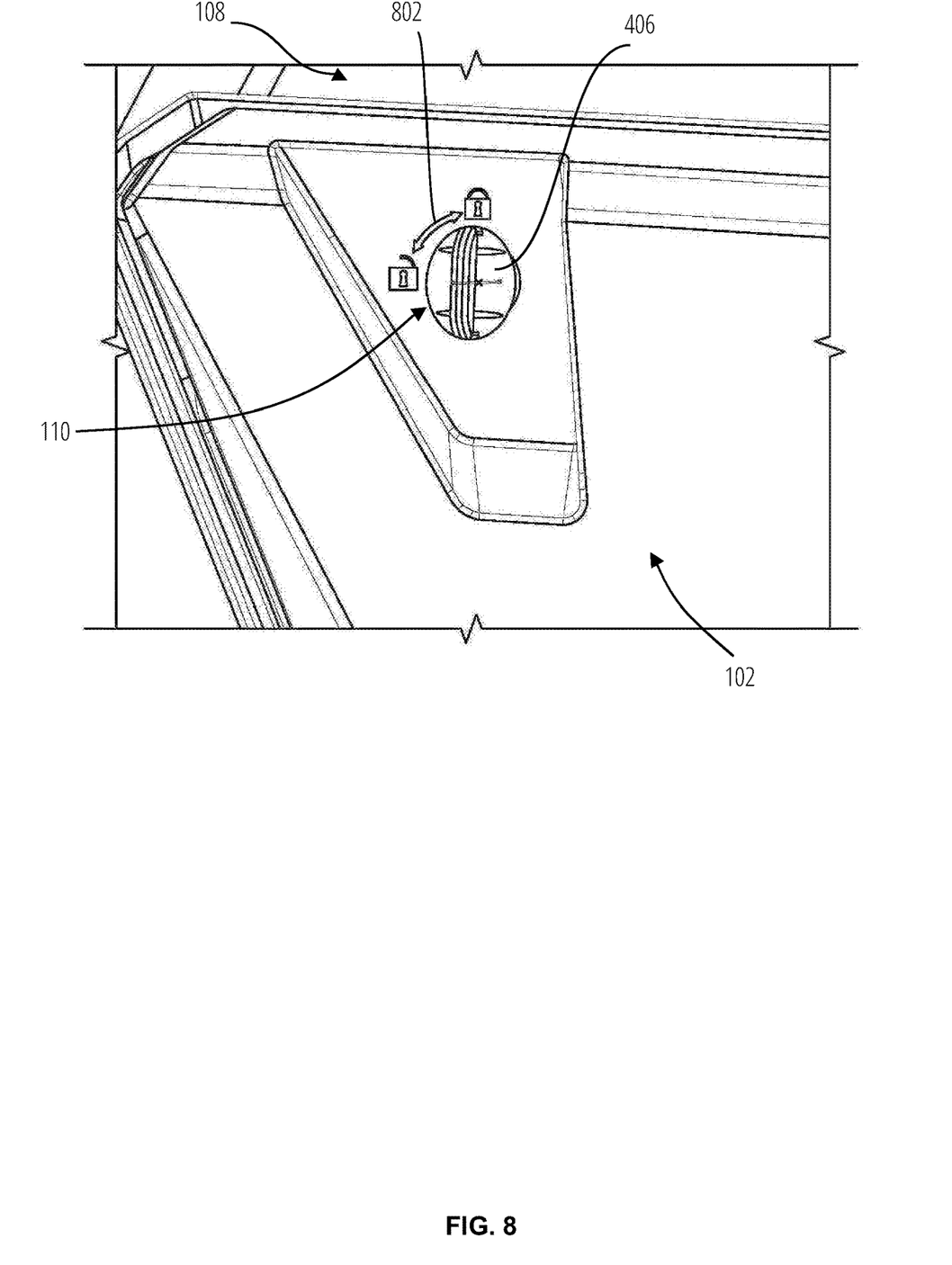
FIG. 8 is a rear perspective view of the second connection on the left of the front wall.
Figure 9:
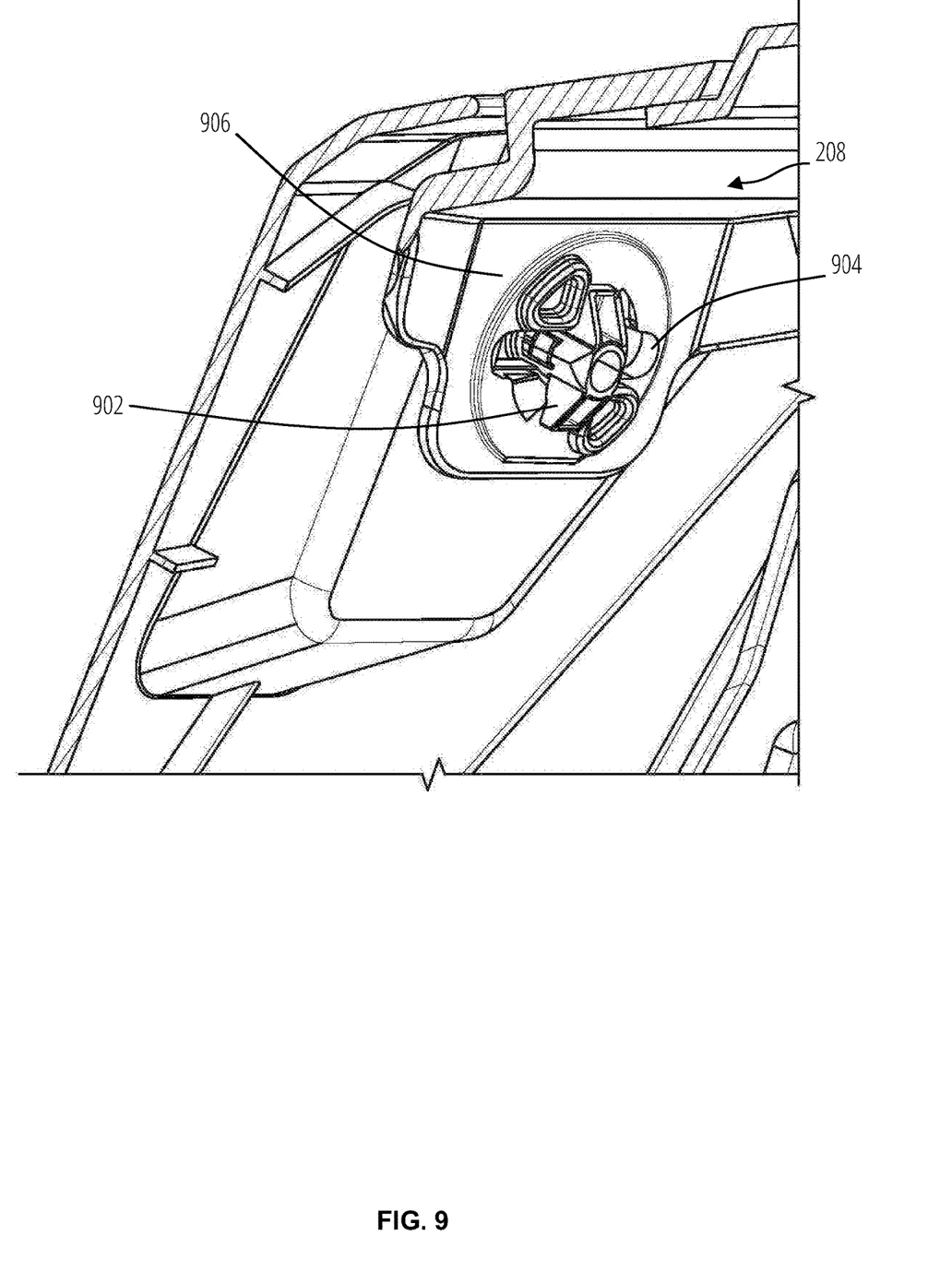
FIG. 9 is a cutaway perspective view of the second connection.

FIG. 8 is a rear view of second connection 110 on the left side of the front wall 102. The at least one twist knob 406 of the second connection 110 is depicted with a locking and unlocking position 802 on the front wall 102. FIG. 9 is a cut-away rear perspective view of FIG. 8 looking toward the rear of the utility vehicle 100. The second connection 110 is shown as a T-shaped anchor portion 902 turned perpendicular to a catch 904 in a locked position in the upper surface 208 of the cargo bed 108 in FIG. 10.

In one embodiment, the catch 904 may be included in an at least one tab connection 906 of the upper surface 208 of the cargo bed 108 as shown in FIG. 9. The T-shaped anchor portion 902 of the second connection 110 is inserted parallel to the catch 904 and the at least one twist knob 406 is rotated approximately 90 degrees so that the T-shaped anchor portion 902 is perpendicular to the catch 904 and securing the at least one twist knob 406 to the upper surface 208 of the cargo bed 108. The second connection 110 is depicted as two twist knobs with two corresponding catches in the upper surface 208 of the cargo bed 108; however, it will be appreciated that additional turn style levers or knobs may be used. Additionally, depending on the size and strength of the front wall 102 the second connection 110 may require more or less than two connections to assure a secure fit.

Figure 10:
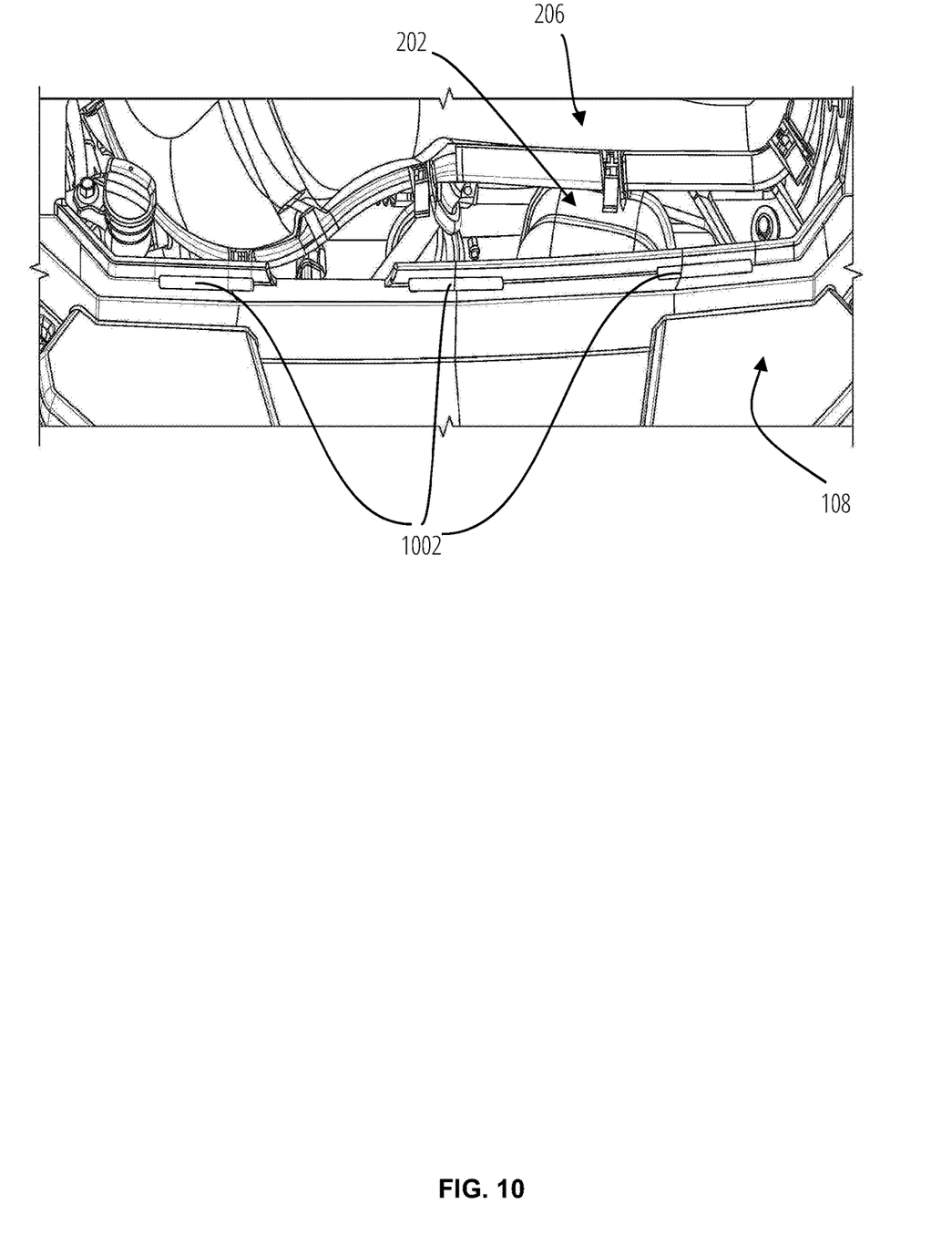
FIG. 10 is a perspective view of the third connection with the front wall removed.
Figure 11:
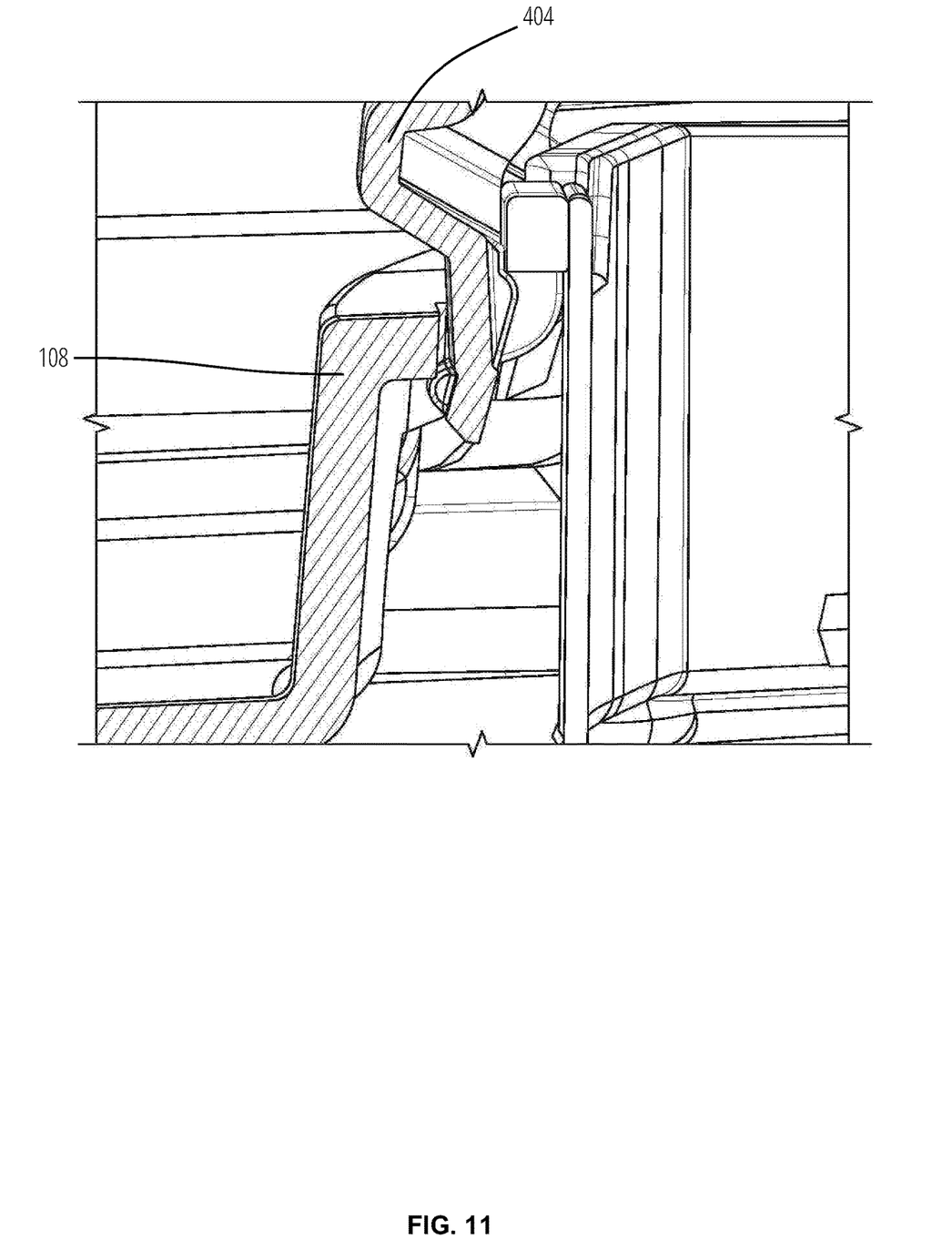
FIG. 11 is a cutaway side view of the third connection in FIG. 3 along section line AA.

FIG. 10 is a perspective view of the third connection 204 with the front wall 102 removed. The third connection 204 is shown as a slot 1002 in the cargo bed 108 in FIG. 10. FIG. 11 is a cut-away side view of FIG. 3 along section line AA. FIG. 11 depicts a portion the third connection 204 where the front wall 102 is installed to the cargo bed 108. In FIG. 11, the third connection 204 is shown with the at least one hook attachment 404 inserted into the slot 1002. The at least one hook attachment 404 of the third connection 204 secures the front wall 102 to the slot 1002. The shape of the at least one hook attachment 404 which may be a tab-like surface, as shown in FIG. 4 or include a variable or stepped surface as shown in FIG. 5 allows the at least one hook attachment 404 to engage the slot 1002 when installed. The engagement of the at least one hook attachment 404 of the third connection 204 restricts movement of the front wall 102 when installed to the cargo bed 108.

In one embodiment, the at least one grommet connection 704 and the at least one twist knob 406 secures an at least one upper connection of the front wall 102 to the cargo bed 108 of the utility vehicle 100. Additional details of one embodiment, may be similar to the another embodiment. For example, the at least one grommet connection 704 and the at least one twist knob 406 of the at least one upper connection are shown in FIG. 3, FIG. 4, and FIG. 5. Similarly, the at least one upper connection may include a handle 402 molded or formed into the front wall 102 with a connecting portion 702 extending from a forward wall 706 of the handle 402 to the at least one grommet connection 704, as shown in FIG. 7. The at least one twist knob 406 of the at least one upper connection secures the front wall 102 to the at least one tab connection 906 as shown in FIG. 9.

Additionally, the at least at least one hook attachment 404 secures an at least one lower connection of the front wall 102 to the cargo bed 108. The shape of the at least one lower connection may include a tab-like surface, as shown in FIG. 4 or include a variable or stepped surface as shown in FIG. 5 to allow the at least one hook attachment 404 to engage the slot 1002 when installed. The engagement of the at least one hook attachment 404 of the third connection 204 restricts movement of the front wall 102 when installed to the cargo bed 108.

In operation, the front wall 102 is removed by turning at least one twist knob 406 of the second connection 110 to an unlocked position where the T-shaped anchor portion 902 is parallel to a catch 904 in the upper surface 208 of the cargo bed 108. Next, the first connection 104 is pulled towards the rear the vehicle. The first connection 104 may include a handle 402 with an opening for a hand. Additionally, the handle 402 may be molded or formed into the front wall 102 with a connecting portion 702 extending from a forward wall 706 of the handle 402. With the connecting portion 702 molded into the handle 402, it can be removed from the at least one grommet connection 704 more easily when pulling the handle 402 of the first connection 104 towards the rear of vehicle due to the force being applied opposite the first connection 104. In general, when a grommet-like connection is not opposite the handle, a panel may become warped or bowed when applying force from the handle to remove the panel.

With the first connection 104 and the second connection 110 uninstalled, the front wall 102 can be tilted towards the rear of the vehicle. For example, the front wall 102 may be rotated or tilted at a 45 degree angle to the bottom surface of the cargo bed 108. Once tilted, the at least one hook attachment 404 of the third connection 204 may be lifted out of the slot 1002 in the cargo bed 108 and the front wall 102 removed.

To install the front wall 102 the at least one hook attachment 404 of the third connection 204 is inserted into the slot 1002 in the cargo bed 108 with the front wall 102 tilted toward the rear of the vehicle. For example, the front wall 102 may be rotated or tilted at a 45 degree angle to a bottom surface of the cargo bed 108. The front wall 102 can then be rotated or tilted so that the first connection 104 and the second connection 110 of the front wall 102 is adjacent to the upper surface 208 of the cargo bed 108.

The first connection 104 or second connection 110 can be installed to the upper surface 208 of the cargo bed 108 in any order. The first connection 104 is installed by the user placing their hand into the molded in handle 402 and pushing the connecting portion 702 of the handle 402 into the at least one grommet connection 704 of the upper surface 208 of the cargo bed 108. The second connection 110 is installed by the user turning the at least one twist knob 406 of the second connection 110 to an unlocked position where the T-shaped anchor portion 902 is parallel to a catch 904 in the upper surface 208 of the cargo bed 108. The T-shaped anchor portion 902 is inserted through the catch 904 in the upper surface 208 and the T-shaped anchor portion 902 can then be rotated to a locked position where it is perpendicular to the catch 904 of the upper surface 208.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A utility vehicle comprising:
   an engine at least partially encompassing an area rearward of a vehicle seat;
   a cargo bed extending rearward of the vehicle seat;
   a front wall of the cargo bed is adjacent to the rearward side of the vehicle seat;
   the front wall of the cargo bed includes a handle; and
   the front wall of the cargo bed is removable from the utility vehicle with at least a first connection, a second connection, wherein the second connection comprises at least one twist knob, and a third connection, wherein components of the engine can be accessed once the front wall of the cargo bed is removed.

2. The utility vehicle of claim 1, wherein the handle is molded into the front wall of the cargo bed with a connecting portion extending from a forward wall of the handle.

3. The utility vehicle of claim 1, wherein the front wall extends a majority width of the cargo bed.

4. The utility vehicle of claim 2, wherein the first connection comprises a grommet connection on the cargo bed for securing to the connecting portion.

5. The utility vehicle of claim 1, wherein the second connection includes a locking and unlocking position.

6. The utility vehicle of claim 5, wherein the at least one twist knob secures the front wall to the cargo bed.

7. The utility vehicle of claim 1, wherein the third connection comprises at least one hook attachment to secure the front wall to a slot in the cargo bed.

8. The utility vehicle of claim 1, wherein an air cleaner is accessible with the front wall removed.

9. A utility vehicle comprising:
   a cargo bed extending rearward of a vehicle seat;
   a front wall of the cargo bed is adjacent to the rearward side of the vehicle seat;
   the front wall of the cargo bed includes a handle; and
   the front wall of the cargo bed is removable from the utility vehicle with at least a first connection, wherein the handle is formed into the front wall of the cargo bed with a connecting portion extending from a forward wall for connecting the front wall to the utility vehicle, wherein the first connection comprises a grommet connection on an upper surface of the cargo bed opposite of the connecting portion.

10. The utility vehicle of claim 9, wherein the upper surface is forward the front wall.

11. The utility vehicle of claim 9, wherein the first connection is released by pulling the handle towards the rear of the utility vehicle.

12. The utility vehicle of claim 9, wherein the front wall of the cargo bed is removable from the utility vehicle with a second connection and a third connection.

13. The utility vehicle of claim 12, wherein the second connection comprises at least one twist knob.

14. The utility vehicle of claim 13, wherein the at least one twist knob secures the front wall to the upper surface of the cargo bed.

15. The utility vehicle of claim 12, wherein the third connection comprises at least one hook attachment to secure the front wall to an opening in the cargo bed.

16. A utility vehicle comprising:
   a cargo bed extending rearward of a vehicle seat;
   a front wall of the cargo bed is adjacent to a rearward side of the vehicle seat; and the front wall of the cargo bed is removable from the utility vehicle with at least one upper connection and at least one lower connection, wherein the at least one lower connection comprises at least one hook attachment to secure the front wall to a slot in the cargo bed, wherein an oil fill cap can be accessed once the front wall of the cargo bed is removed.

17. The utility vehicle of claim 16, wherein the at least one upper connection includes at least one grommet connection and at least one tab connection on an upper surface of the cargo bed.

18. The utility vehicle of claim 17, wherein the at least one upper connection includes a handle molded into the front wall with a connecting portion extending from a forward wall of the handle to attach the front wall to the at least one grommet connection on the upper surface of the cargo bed.

19. The utility vehicle of claim 17, wherein the at least one upper connection includes at least one twist knob to attach the front wall to the at least one tab connection on the upper surface of the cargo bed.

20. The utility vehicle of claim 16, wherein the at least one hook attachment includes a stepped surface to engage the slot in the cargo bed.

* * * * *